United States Patent
Park et al.

(10) Patent No.: US 9,392,596 B2
(45) Date of Patent: Jul. 12, 2016

(54) METHOD FOR ALLOWING MTC TERMINAL TO TRANSMIT AND RECEIVE SIGNAL IN WIRELESS COMMUNICATION SYSTEM

(71) Applicant: LG ELECTRONICS INC., Seoul (KR)

(72) Inventors: Kyujin Park, Anyang-si (KR); Jiwoong Jang, Anyang-si (KR); Hangyu Cho, Anyang-si (KR); Seunghyun Kang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 173 days.

(21) Appl. No.: 14/352,986

(22) PCT Filed: Oct. 18, 2012

(86) PCT No.: PCT/KR2012/008518
§ 371 (c)(1),
(2) Date: Apr. 18, 2014

(87) PCT Pub. No.: WO2013/058564
PCT Pub. Date: Apr. 25, 2013

(65) Prior Publication Data
US 2014/0328230 A1 Nov. 6, 2014

Related U.S. Application Data

(60) Provisional application No. 61/549,179, filed on Oct. 19, 2011.

(51) Int. Cl.
*H04Q 9/00* (2006.01)
*H04W 72/04* (2009.01)
(Continued)

(52) U.S. Cl.
CPC .............. *H04W 72/042* (2013.01); *H04L 5/14* (2013.01); *H04W 4/005* (2013.01); *H04W 28/18* (2013.01)

(58) Field of Classification Search
CPC .......... H04W 72/042; H04W 72/1289; H04W 4/005
USPC ................... 370/329; 455/509, 450
See application file for complete search history.

(56) References Cited

U.S. PATENT DOCUMENTS

2005/0091407 A1* 4/2005 Vaziri ............... H04L 29/06027
709/246
2009/0262681 A1* 10/2009 Park .................. H04W 74/0866
370/328

(Continued)

FOREIGN PATENT DOCUMENTS

KR    10-2011-0083487    7/2011
WO    2011/121374        10/2011

OTHER PUBLICATIONS

Intel, et al., "Optimized schemes of network re-entry for M2M in 16m," IEEE 802.16 Broadband Wireless Access Working Group, IEEE C802.16p-11_0092r4, May 2011, 8 pages.

(Continued)

*Primary Examiner* — Wanda Z Russell
(74) *Attorney, Agent, or Firm* — Lee, Hong, Degerman, Kang & Walmey; Jonathan Kang; Michael Monaco

(57) ABSTRACT

Disclosed is a method for allowing a machine type communication (MTC) terminal to transmit and receive a signal in a wireless communication system. A method for allowing an MTC terminal to transmit and receive a signal comprises the steps of: receiving, from a base station, a parameter related to active subframe information for said MTC terminal; obtaining information on active subframe allocated to said MTC terminal by using said received parameter; and transmitting a signal to said base station or receiving a signal from said base station through at least one active subframe on the basis of said obtained information on the active subframes.

15 Claims, 7 Drawing Sheets

(51) Int. Cl.
 *H04L 5/14* (2006.01)
 *H04W 4/00* (2009.01)
 *H04W 28/18* (2009.01)

(56) References Cited

U.S. PATENT DOCUMENTS

| | | | | |
|---|---|---|---|---|
| 2011/0244907 | A1* | 10/2011 | Golaup | H04W 4/005 455/509 |
| 2012/0129540 | A1* | 5/2012 | Hakola | H04W 72/042 455/450 |
| 2012/0230245 | A1* | 9/2012 | Ostergaard | H04W 72/0426 370/315 |
| 2013/0015953 | A1* | 1/2013 | Hsu | H04W 4/005 340/7.46 |
| 2013/0155948 | A1* | 6/2013 | Pinheiro | H04W 4/005 370/328 |
| 2013/0182674 | A1* | 7/2013 | Lunttila | H04L 5/001 370/329 |
| 2013/0188550 | A1* | 7/2013 | Noh | H04W 72/0446 370/312 |
| 2014/0105164 | A1* | 4/2014 | Moulsley | H04W 72/042 370/329 |

OTHER PUBLICATIONS

LG Electronics, "Ranging resource allocation for idle mode fixed M2M device in WirelessMAN IMTAdvanced system," IEEE 802.16 Broadband Wireless Access Working Group, IEEE C802.16p-11/0226r3, Sep. 2011, 6 pages.

PCT International Application No. PCT/KR2012/008518, Written Opinion of the International Searching Authority dated Feb. 15, 2013, 21 pages.

\* cited by examiner

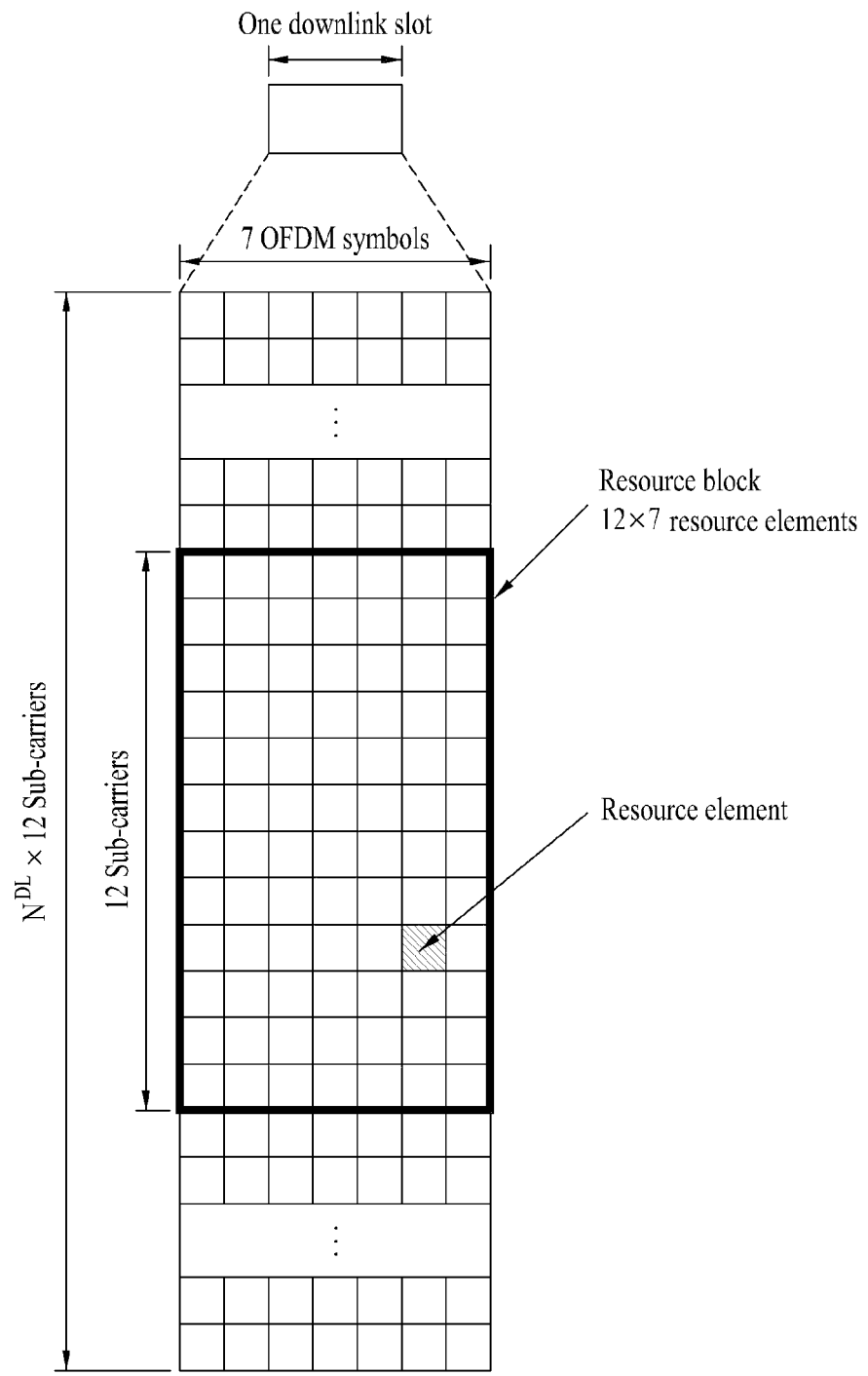

FIG. 6
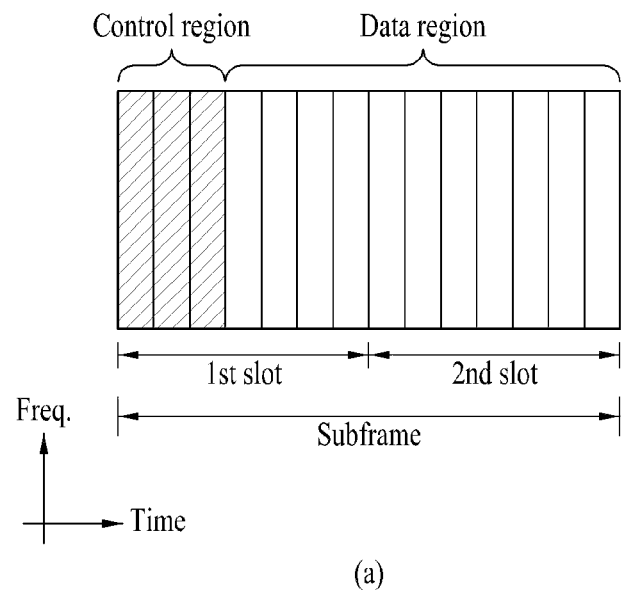
(a)
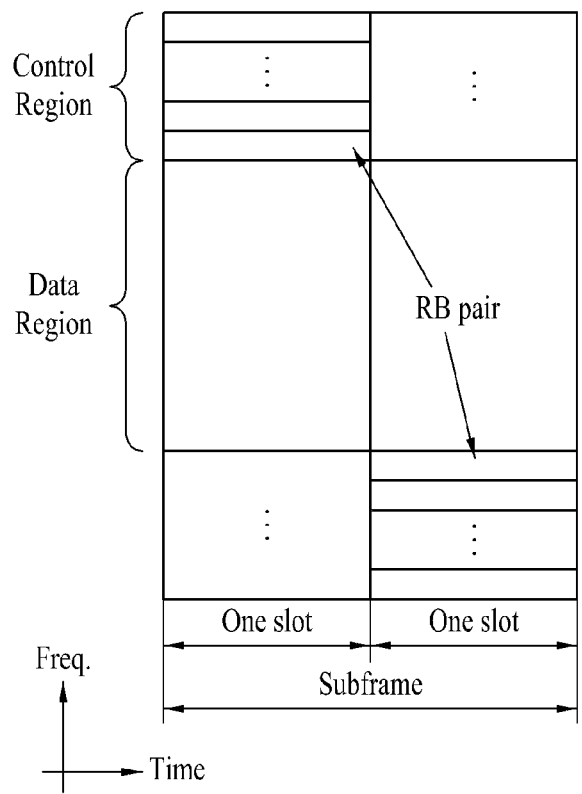
(b)

METHOD FOR ALLOWING MTC TERMINAL TO TRANSMIT AND RECEIVE SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2012/008518, filed on Oct. 18, 2012, which claims the benefit of U.S. Provisional Application Ser. No. 61/549,179, filed on Oct. 19, 2011, the contents of which are all hereby incorporated by reference herein in their entirety.

FIELD OF THE INVENTION

The present invention relates to wireless communication, and more particularly to a method for transmitting and receiving a signal by a Machine Type Communication (MTC) terminal in a wireless communication system.

BACKGROUND ART

Machine-to-machine (M2M) communication is communication between electronic devices as the name implies. While M2M communication means wired or wireless communication between electronic devices or communication between a human-controlled device and a machine in the broadest sense, these days M2M communication typically refers to wireless communication between electronic devices.

When the concept of M2M communication was introduced in the early 1990s, it was regarded merely as the concept of remote control or telematics and the market therefor was very limited. However, M2M communication has been rapidly developed and the M2M communication market has attracted much attention all over the world over the past few years. Especially, M2M communication has great influence in the fields of fleet management, remote monitoring of machines and facilities, smart metering for automatically measuring operating time of construction equipment and consumption of heat or electricity, etc. in the Point Of Sales (POS) market and security-related applications. It is expected that M2M communication will find various uses in conjunction with legacy mobile communication, very high-speed wireless Internet or Wireless Fidelity (WiFi), and low-output communication solutions such as ZigBee and thus will extend to Business to Customer (B2C) markets beyond Business-to-Business (B2B) markets.

In the era of M2M communication, every machine equipped with a Subscriber Identity Module (SIM) card can be managed and controlled remotely because it is possible to transmit data to and receive data from the machine. For example, M2M communication is applicable to a very broad range including numerous terminals and equipment such as a car, a truck, a train, a container, an automatic vending machine, a gas tank, etc.

Since an M2M device or MTC device may not frequently transmit and receive signals like a general UE or a Human Type Communication (HTC) terminal, a method for scheduling the MTC device to implement high communication throughput and efficient resource consumption is needed, and there is a need to inform the MTC device of this scheduling information. However, a method for scheduling the MTC device and a method for signaling this scheduling method have not yet been disclosed.

DETAILED DESCRIPTION OF THE INVENTION

Technical Problem

An object of the present invention is to provide a method for transceiving a signal by a Machine Type Communication (MTC) terminal in a wireless communication system.

Another object of the present invention is to provide an MTC device for transceiving a signal in a wireless communication system.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for transceiving a signal by a Machine Type Communication (MTC) user equipment (UE) in a wireless communication system including: receiving a parameter associated with active subframe information for the MTC UE from a base station (BS); acquiring information regarding the active subframe allocated to the MTC UE using the received parameter; and transmitting/receiving a signal to/from the BS through at least one active subframe on the basis of the acquired active subframe information. The active subframe is specifically configured per MTC UE, and the parameter is received through higher layer signaling.

The parameter is received as a bitmap field having a size of predetermined bits or as a type of bit value having a predetermined size, a set of the active subframe is acquired based upon the parameter, and the at least one active subframe is a subframe contained in the acquired active subframe set. The parameter is a bitmap field having a size of 8 bits, and the active subframe set includes any one of 1 to 8 active subframes. If the parameter is represented by the bit value of the predetermined size, the parameter is represented by a function of a cell—radio network temporary identifier (C-RNTI) of the MTC UE. The C-RNTI function of the MTC UE is set to Least Significant Bits (LSBs) having a size of predetermined bits of the C-RNTI, or is set to Most Significant Bits (MSBs) having a size of predetermined bits of the C-RNTI. The size of predetermined bits may be 3 bits or 8 bits. The parameter may be used in a Frequency Division Duplex (FDD) frame structure. The size of predetermined bits is 3 bits, and the active subframe set acquired based upon the parameter of 3 bits includes a single active subframe.

The method may further include: if the active subframe is a downlink active subframe, acquiring information regarding the downlink active subframe based upon a parameter associated with the downlink active subframe; and recognizing an uplink subframe located after 4 subframes from the downlink active subframe as an uplink active subframe. The method may further include: if the active subframe is an uplink active subframe, acquiring information regarding the uplink active subframe based upon a parameter associated with the uplink active subframe; and recognizing a downlink subframe located 4 subframes before the uplink active subframe as a downlink active subframe.

In another aspect of the present invention, a Machine Type Communication (MTC) user equipment (UE) for transmitting/receiving a signal to/from a base station (BS) in a wireless communication system includes: a radio frequency (RF) module configured to receive a parameter associated with active subframe information for the MTC UE from the base station (BS); and a processor configured to acquire information regarding the active subframe allocated to the MTC UE using the received parameter, wherein the RF module is configured to transmit/receive a signal to/from the BS through at least one active subframe on the basis of the acquired active subframe information. The parameter is received as a bitmap field having a size of predetermined bits or as a type of bit value having a predetermined size, the processor is configured to acquire a set of the active subframe based upon the parameter, wherein he at least one active subframe is a subframe contained in the acquired active subframe set.

If the active subframe is a downlink active subframe, the processor is configured to acquire information regarding the downlink active subframe on the basis of a parameter associated with the downlink active subframe, and is configured to recognize an uplink subframe located after 4 subframes from the downlink active subframe as an uplink active subframe. If the active subframe is an uplink active subframe, the processor is configured to acquire information regarding the uplink active subframe on the basis of a parameter associated with the uplink active subframe, and is configured to recognize a downlink subframe located 4 subframes before the uplink active subframe as a downlink active subframe.

Effects of the Invention

As is apparent from the above description, exemplary embodiments of the present invention can perform efficient communication because the MTC terminal (also called an MTC UE) transmits/receives signals through downlink/uplink (DL/UL) active subframes allocated according to various methods.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

FIG. 5 is a diagram illustrating a resource grid of a downlink slot for use in a 3GPP LTE/LTE-A system as an exemplary mobile communication system.

FIG. 6 is a diagram illustrating a subframe for use in a 3GPP LTE/LTE-A system as an exemplary mobile communication system.

BEST MODE FOR CARRYING OUT THE INVENTION

Figure 1:
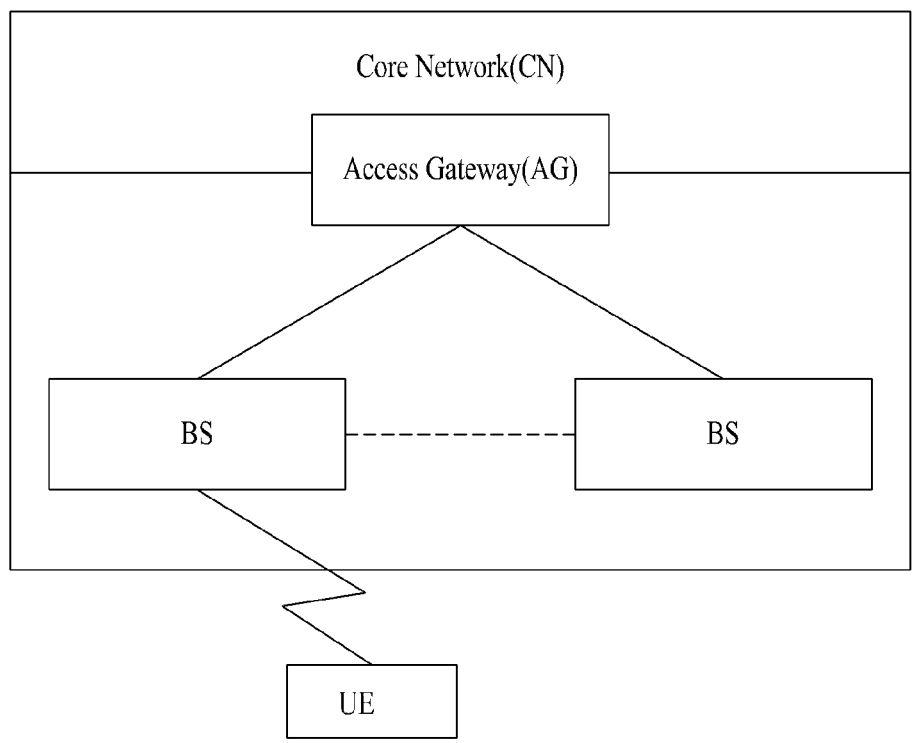
FIG. 1 is a conceptual diagram illustrating an Evolved Universal Mobile Telecommunications System (E-UMTS) network structure as an example of a wireless communication system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP LTE or LTE-A system, but the present invention is not limited thereto and the remaining parts of the present invention other than unique characteristics of the 3GPP LTE or LTE-A system are applicable to other mobile communication systems.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

In the following description, a terminal may refer to a mobile or fixed user equipment (UE), for example, a user equipment (UE), a mobile station (MS) and the like. Also, the base station (BS) may refer to an arbitrary node of a network end which communicates with the above terminal, and may include an eNode B (eNB), a Node B (Node-B), an access point (AP) and the like.

In a mobile communication system, the UE may receive information from the base station (BS) via a downlink, and may transmit information via an uplink. The information that is transmitted and received to and from the UE includes data and a variety of control information. A variety of physical channels are used according to categories of transmission (Tx) and reception (Rx) information of the UE.

The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. LTE-Advanced (LTE-A) is an evolved version of 3GPP LTE.

It should be noted that specific terms disclosed in the present invention are proposed for convenience of description and better understanding of the present invention, and the use of these specific terms may be changed to other formats within the technical scope or spirit of the present invention.

FIG. 1 is a conceptual diagram illustrating an Evolved Universal Mobile Telecommunications System (E-UMTS) network structure as an exemplary mobile communication system.

In particular, the Enhanced Universal Mobile Telecommunications System (E-UMTS) has evolved from a legacy UMTS system, and basic standardization thereof is now being conducted by the 3rd Generation Partnership Project (3GPP). E-UMTS may also be referred to as Long Term Evolution (LTE). For details of the technical specifications of UMTS and E-UMTS, refer to Release 7 and Release 8 of "3rd Generation Partnership Project; Technical Specification Group Radio Access Network".

As shown in FIG. 1, the E-UMTS system is broadly made up of a User Equipment (UE) 120, base stations (or eNode-Bs) 110*a* and 110*b*, and an Access Gateway (AG) which is located at an end of a network (E-UTRAN) and is connected to an external network. Generally, an eNode-B can simultaneously transmit multiple data streams for a broadcast service, a multicast service and/or a unicast service.

Each eNode-B includes one or more cells. One cell of the eNode-B is set to use a bandwidth such as 1.25, 2.5, 5, 10, 15 or 20 MHz to provide a downlink or uplink transmission service to user equipments (UEs). Here, different cells may be set to use different bandwidths. The eNode-B controls transmission and reception of data for several UEs. In association with downlink (DL) data, the eNode-B transmits downlink (DL) scheduling information to a corresponding UE, so as to inform the corresponding UE of time/frequency domains where data is to be transmitted, coding information, data size information, Hybrid Automatic Repeat and reQuest (HARQ)—related information, and the like. In association with uplink (UL) data, the eNode-B transmits UL scheduling information to the corresponding UE, so that it informs the corresponding UE of time/frequency domains capable of being used by the corresponding UE, coding information, data size information, HARQ-related information, and the like. An interface for transmission of user traffic or control traffic may be used between eNode-Bs. A Core Network (CN) may include an Access Gateway (AG) and a network node for user registration of the UE. The AG manages mobility of a UE on the basis of a Tracking Area (TA) composed of several cells.

Although wireless communication technology has been developed to LTE technology on the basis of WCDMA technology, users and enterprises continuously demand new features and services. In addition, other wireless access technologies are being developed, such that there is a need for new or improved wireless access technology in order to remain competitive in the long run. For example, reduction in cost per bit, increase of service availability, adaptive frequency band utilization, a simple structure, an open-type interface, and appropriate user equipment (UE) power consumption are needed for new or improved wireless access technology.

Recently, 3GPP has been establishing a standard for a successor to LTE. In this specification, such a technique is referred to as "LTE-Advanced" or "LTE-A". One of the main differences between an LTE system and an LTE-A system is a system bandwidth and the introduction of a Relay Node (RN).

The LTE-A system is aimed at supporting a broadband of a maximum of 100 MHz, and to this end, the LTE-A system is designed to use a carrier aggregation or bandwidth aggregation technique using a plurality of frequency blocks.

Carrier aggregation aggregates a plurality of frequency blocks as one logical frequency band in order to use a wider frequency band. A bandwidth of each frequency block may be defined based on a bandwidth of a system block used in the LTE system. Each frequency block is transmitted using a component carrier.

Figure 2:
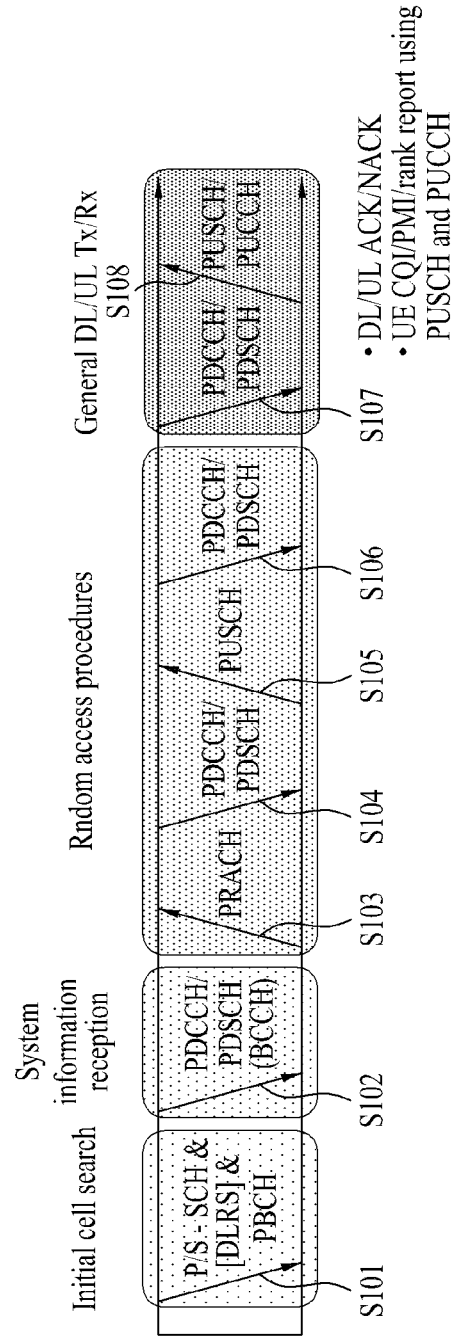
FIG. 2 is a conceptual diagram illustrating physical channels used in a 3GPP LTE system as an exemplary mobile communication system and a general method for transmitting a signal using the physical channels.

FIG. 2 is a conceptual diagram illustrating physical channels used in a 3GPP LTE system as an exemplary mobile communication system and a general method for transmitting a signal using the physical channels.

Referring to FIG. 2, when powered on or when entering a new cell, a UE performs initial cell search in step S101. The initial cell search involves synchronization with a BS. Specifically, the UE synchronizes with the BS and acquires a cell Identifier (ID) and other information by receiving a Primary Synchronization CHannel (P-SCH) and a Secondary Synchronization CHannel (S-SCH) from the BS. Then the UE may acquire information broadcast in the cell by receiving a Physical Broadcast CHannel (PBCH) from the BS. During the initial cell search, the UE may monitor a downlink channel status by receiving a downlink Reference Signal (DL RS).

After initial cell search, the UE may acquire more specific system information by receiving a Physical Downlink Control CHannel (PDCCH) and receiving a Physical Downlink Shared CHannel (PDSCH) based on information of the PDCCH in step S102.

Thereafter, if the UE initially accesses the BS or does not include radio resources for signal transmission, it may perform random access to the BS in steps S103 to S106. For random access, the UE may transmit a specific sequence used as a preamble to the BS on a Physical Random Access CHannel (PRACH) in step S103 and receive a response message for the random access on a PDCCH and a PDSCH corresponding to the PDCCH in step S104. In the case of contention-based random access, rather than handover, the UE may transmit an additional PRACH in step S105, and receive a PDCCH and a PDSCH corresponding to the PDCCH in step S106 in such a manner that the UE can perform a contention resolution procedure.

After the above random access procedure, the UE may receive a PDCCH/PDSCH (S107) and transmit a Physical Uplink Shared CHannel (PUSCH)/Physical Uplink Control CHannel (PUCCH) (S108) in a general uplink/downlink signal transmission procedure. Control information transmitted to/received from the BS by the UE includes DL/UL ACKnowledgment/Negative-ACK (ACK/NACK) signals, a Channel Quality Indictor (CQI), a Precoding Matrix Index (PMI), and a Rank Indicator (RI), etc. A user equipment (UE) for use in the 3GPP system may transmit control information such as CQI/PMI/RI through a PUSCH and/or a PUCCH.

Figure 3:
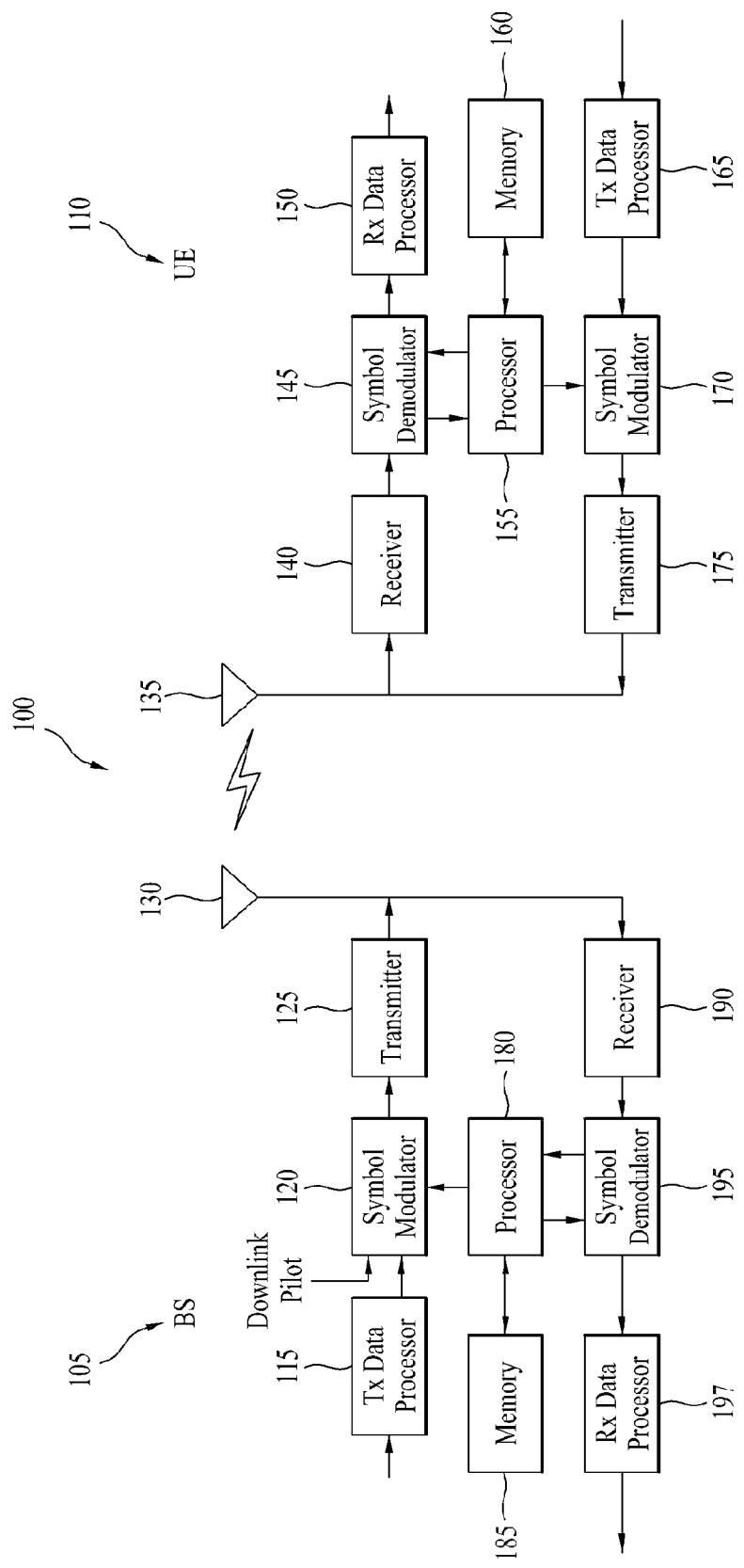
FIG. 3 is a block diagram illustrating a base station (BS) and a user equipment (UE) for use in a wireless communication system.

FIG. 3 is a block diagram illustrating a base station (BS) 105 and a user equipment (UE) 110 for use in a wireless communication system 100 according to the present invention.

Although FIG. 3 shows one BS 105 and one UE 110 (including MTC UE) for brief description of the wireless communication system 100, it should be noted that the wireless communication system 100 may further include one or more BSs and/or one or more UEs.

Referring to FIG. 3, the BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and a Rx data processor 150. In FIG. 1, although one antenna 130 is used for the BS 105 and one antenna 135 is used for the UE 110, each of the BS 105 and the UE 110 may also include a plurality of antennas as necessary. Therefore, the BS 105 and the UE 110 according to the present invention support a Multiple Input Multiple Output (MIMO) system. The BS 105 according to the present invention can support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, and interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the RN through the antenna 130. The Tx antenna 130 transmits the generated DL signal to the UE.

Configuration of the UE 110 will hereinafter be described in detail. The Rx antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the eNB 105.

The Tx data processor 165 of the UE 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 receives and processes the stream of symbols to generate an uplink (UL) signal, and the UL signal is transmitted to the BS 105 through the Tx antenna 135.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110. The transmitter 175 and the receiver 190 of the UE 110 may also be implemented as one RF module as necessary.

Processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 110 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present invention may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 155 or 180 or the memory unit 160 or 185, such that it can be driven by the processor 155 or 180.

Radio interface protocol layers among the UE 110, the BS 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 110 and the BS 105 may exchange RRC messages with each other through the wireless communication network and the RRC layer.

Figure 4A:
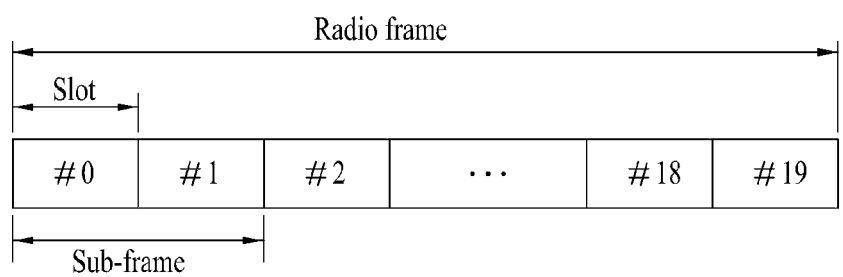
FIG. 4 is a diagram illustrating a structure of a radio frame used in a 3GPP LTE/LTE-A system as an exemplary mobile communication system.

FIG. 4 is a diagram illustrating a structure of a radio frame used in a 3GPP LTE/LTE-A system as an exemplary mobile communication system.

In a cellular OFDM wireless packet communication system, an uplink/downlink data packet is transmitted on a subframe basis and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 4(*a*) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot depends on cyclic prefix (CP) configuration. CP is divided into an extended CP and a normal CP. For example, when OFDM symbols are configured according to normal CP, the number of OFDM symbols included in one slot may be 7. When the OFDM symbols are configured according to extended CP, the duration of one OFDM symbol increases and thus the number of OFDM symbols included in one slot is smaller than the number of OFDM symbols included in one slot when the OFDM symbols are configured using the normal CP. In the extended CP case, the number of OFDM symbols included in one slot may be 6, for example. When a channel status is unstable, for example, when a UE moves at a high speed, the extended CP can be used to reduce inter-symbol interference.

When the normal CP is used, one slot includes 7 OFDM symbols, and thus one subframe includes 14 OFDM symbols. In this case, up to three OFDM symbols at the start of each subframe can be allocated to a physical downlink control channel (PDCCH) and the other three OFDM symbols can be allocated to a physical downlink shared channel (PDSCH).

Figure 4B:
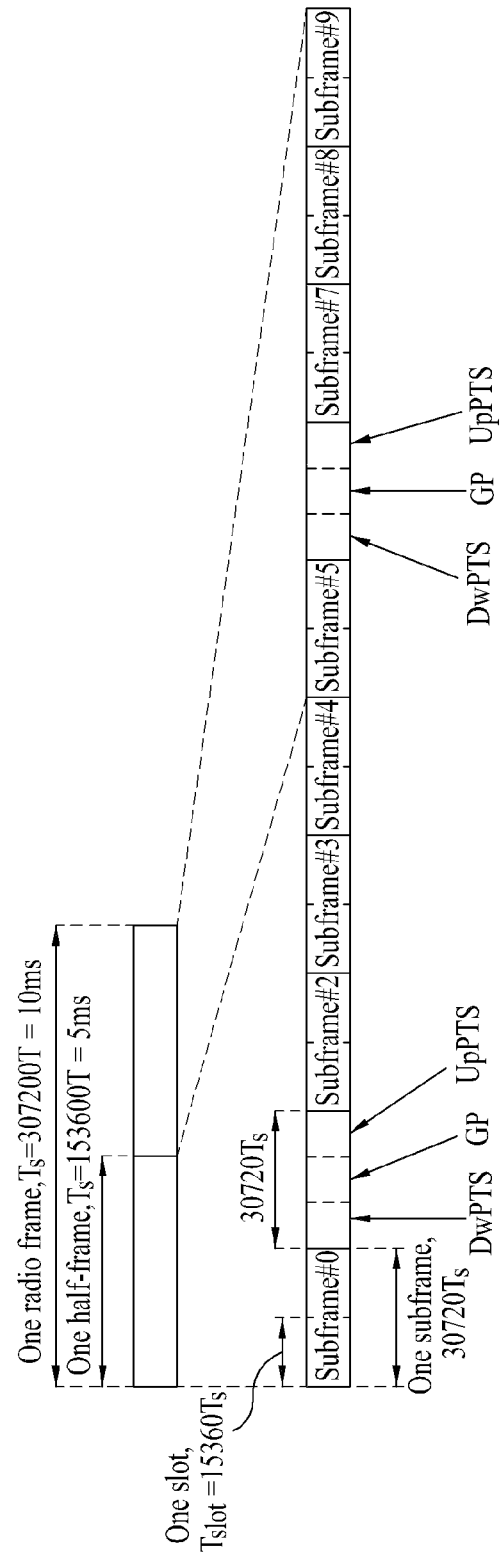

FIG. 4(b) illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal.

Each half-frame includes five subframes, "D" denotes a subframe reserved for downlink transmission, "U" denotes a subframe reserved for uplink transmission, and "S" denotes a special subframe including a downlink pilot time slot (DwPTS), a guard period (GP), and an uplink pilot time slot (UpPTS). DwPTS is used for initial cell search, synchronization, or channel estimation by a UE. UpPTS is used for channel estimation by a BS and uplink transmission synchronization in a. UE. The GP is a period for removal of interference generated in uplink due to multipath delay of a downlink signal between uplink and downlink.

In case of 5 ms downlink-to-uplink switch-point periodicity, the special subframe S exists in all half-frames. In case of 5 ms downlink-to-uplink switch-point periodicity, the special subframe S exists in a first half frame only. Subframes #0 and #5 (subframes 0 and 5) and DwPTS are always reserved for downlink transmission. A subframe immediately subsequent to UpPTS and the special subframe is always reserved for uplink transmission. When multiple cells are aggregated, the UE assumes the same uplink-downlink configuration across all the cells and that GPs of special subframes different cells have an overlap of at least $1456 \cdot T_s$. The aforementioned structure of the radio frame is merely an example and various modifications may be made in the number of subframes included in the radio frame, the number of slots included in the subframe, or the number of symbols included in the slot.

Table 1 below shows special subframe configuration (length of DwPTS/GP/UpPTS).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | | | |
| 8 | $24144 \cdot T_s$ | | | | | |

Table 2 below shows uplink-downlink configuration.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As shown in Table 2 above, a frame structure type 2 of 3GPP LTE has seven uplink-downlink configurations. According to configuration, the position or number of a downlink subframe, a special frame, and an uplink subframe may be differently configured. Hereinafter, various embodiments of the present invention will be described in terms of uplink-downlink configurations of the frame structure 2 shown in Table 2 above.

The aforementioned structure of the radio frame is only exemplary, and various modifications can be made to the number of subframes contained in the radio frame or the number of slots contained in each subframe, or the number of symbols in each slot.

FIG. 5 is a diagram illustrating a resource grid of a downlink slot for use in a 3GPP LTE/LTE-A system as an exemplary mobile communication system.

Referring to FIG. 5, a downlink slot includes a plurality of OFDM symbols in a time domain. One downlink slot includes 7 (or 6) OFDM symbols and a resource block (RB) includes 12 subcarriers in a frequency domain. Each element on a resource grid may be defined as a resource element (RE). One RB includes 12×7 (or 12×6) REs. The number ($N_{RB}$) of RBs contained in a downlink slot is dependent upon a downlink transmission bandwidth. An uplink slot structure is identical to the downlink slot structure, but OFDM symbols are replaced with SC-FDMA symbols in the uplink slot structure differently from the downlink slot structure.

FIG. 6 is a diagram illustrating a downlink subframe for use in a 3GPP LTE/LTE-A system as an exemplary mobile communication system.

Referring to FIG. 6, a maximum of three (or four) OFDM symbols located in the front part of a first slot of the subframe may correspond to a control region to which a control channel is allocated. The remaining OFDM symbols correspond to a data region to which a Physical Downlink Shared Channel (PDSCH) is allocated. A variety of downlink control channels may be used in LTE, for example, a Physical Control Format Indicator Channel (PCFICH), a Physical Downlink Control Channel (PDCCH), a Physical hybrid ARQ indicator Channel (PHICH), etc. PCFICH is transmitted from a first OFDM symbol of the subframe, and carries information about the number of OFDM symbols used for transmitting a control channel within the subframe. PHICH carries a Hybrid Automatic Repeat request acknowledgment/negative-acknowledgment (HARQ ACK/NACK) signal as a response to an uplink transmission signal.

Control information transmitted on a PDCCH is referred to as downlink control information (DCI). DCI format 0 is defined for uplink and DCI formats 1, 1A, 1B, 1C, 1D, 2, 2A, 3 and 3A are defined for downlink. A DCI format selectively includes information such as a hopping flag, RB allocation information, modulation and coding scheme (MCS), redundancy version (RV), a new data indicator (NDI), transmit power control (TPC), a cyclic shift demodulation reference signal (DM RS), channel quality indicator (CQI) request, HARQ process number, transmitted precoding matrix indicator (TPMI), precoding matrix indicator (PMI) configuration, etc. according to the purpose thereof.

The PDCCH carries transport format and resource allocation information of a downlink shared channel (DL-SCH), transport format and resource allocation information of an uplink shared channel (UL-SCH), paging information on a paging channel (PCH), system information on the DL-SCH, resource allocation information of a higher-layer control message, such as a random access response transmitted on a PDSCH, a Tx power control command set with respect to individual UEs in a UE group, a Tx power control command, activation of voice over IP (VoIP), etc. A plurality of PDCCHs can be transmitted in the control region. A UE can monitor the plurality of PDCCHs. The PDCCH is transmitted as an aggregate of one or more consecutive control channel elements (CCEs). A CCE is a logical allocation unit used to provide a coding rate based on a radio channel state to the PDCCH. The CCE corresponds to a plurality of resource element groups (REGs). The format of the PDCCH and the number of bits of the PDCCH are determined on the basis of the number of CCEs. A BS determines a PDCCH format according to DCI to be transmitted to a UE and adds cyclic redundancy check (CRC) to control information. The CRC is masked by an identifier (e.g. radio network temporary identifier (RNTI)) according to the owner or purpose of the PDCCH. For example, when the PDCCH is destined for a specific UE, the CRC can be masked by the identifier (e.g. cell-RNTI (C-RNTI)) of the specific UE. When the PDCCH is for a paging message, the CRC can be masked by a paging identifier (e.g. paging-RNTI (P-RNTI)). When the PDCCH is for system information (more specifically, a system information block (SIC)), the CRC can be masked by a System Information RNTI (SI-RNTI). When the PDCCH is for a random access response, the CRC can be masked by a random access RNTI (RA-RNTI).

On the other hand, an uplink subframe includes a plurality of slots (e.g. two slots). The slots may include different numbers of SC-FDMA symbols according to CP length. The uplink subframe is divided into a data region and a control region in the frequency domain. The data region includes a PUSCH and is used to transmit a data signal such as audio data. The control region includes a PUCCH and is used to transmit Uplink Control Information (UCI). The PUCCH includes RB pairs located on both ends of the data region in the frequency domain and is hopped based on slots.

The PUCCH can be used to transmit the following control information.

Scheduling request (SR): This is information used to request a UL-SCH resource and is transmitted using On-Off Keying (OOK).

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.

Channel quality indicator (CQI): This is feedback information about a downlink channel. Feedback information regarding Multiple Input Multiple Output (MIMO) includes a rank indicator (RI), a precoding matrix indicator (PMI), a precoding type indicator (PTI), etc. 20 bits are used per subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports 7 formats according to information transmitted thereon.

Table 3 shows the mapping relationship between PUCCH formats and UCI in LTE.

TABLE 3

| PUCCH format | UCI (Uplink Control Information) |
| --- | --- |
| Format 1 | SR (scheduling request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |

The term "MTC terminal" may refer to an M2M device, an M2M communication device, an MTC communication device, etc. According to the legacy wireless communication system, a wireless mobile communication system and a UE thereof have been designed to maximize UE throughput on the basis of the scheme for providing voice/data services for a mobile UE. However, as fully autonomous MTC terminals have recently been proposed, extensive research into a wireless communication network technology for supporting a low-cost MTC terminal has also been discussed in the present 3GPP RAN1 specification.

As discussed in 3GPP RAN1, the present invention proposes a method for limiting Tx/Rx-available subframes of uplink/downlink (UL/DL) so as to reduce not only blind decoding of an MTC terminal but also the number of HARQ processes. Although the present invention has been disclosed on the basis of 3GPP LTE/LTE-A, the scope or spirit of the present invention may also be applied to other wireless communication systems such as IEEE 802.16 without difficulty.

In 3GPP LTE/LTE-A, a UE may be largely operated in two states. One of the two states denotes a "connected state or RRC_connected state" in which the UE performs a network entry procedure to a base station (BS) and establishes UL/DL synchronization with the BS so as to transmit/receive data and control information to/from the BS. As a result, during the connected state or RRC_connected state, the UE may receive a Cell-Radio Network Temporary Identifier (C-RNTI) from the BS. In the 3GPP LTE/LTE-A system, UEs in the (RRC) connected state have been designed to transmit/receive UL/DL data in all subframes as well as to receive associated DL control channels. That is, all UEs can perform blind decoding of a downlink physical control channel so as to receive scheduling information for each UE every subframe, such that the UEs can receive a downlink data channel and at the same time can transmit an uplink data channel and an uplink control channel.

However, an MTC UE (also called 'MTC terminal') needs to minimize hardware and software complexity as well as to simplify associated UE operations, such that the MTC UE can greatly reduce production costs of UEs differently from the legacy UE designed to implement a high transfer rate. For this purpose, many developers and companies are conducting intensive research into a method for allowing the above-mentioned MTC UE to perform sequential processing of many parts by simplifying hardware and software so as to reduce UE cost, instead of maximizing the processing speed through parallel processing as in the legacy UE. From this point of view, the MTC UE does not perform parallel processing of 8 HARQ processes as in the legacy UE, and may be designed to process data communication through one HARQ process or a smaller number of HARQ processes than 8. In addition, it may be necessary for the MTC UE to perform data communication through all subframes according to the aforementioned design.

The present invention proposes not only a method for allocating an active subframe for an MTC UE supporting the limited HARQ process, but also UE operations associated with the above method.

First of all, definition of the active subframe for the MTC UE proposed by the present invention will hereinafter be described in detail. The term "active subframe" is merely exemplary, and other terms may be used as necessary. The MTC UE may operate to perform transmission/reception (Tx/Rx) of DL/UL data and control information only through the active subframe allocated from the BS. That is, within the remaining DL subframes other than a DL active subframe, the BS may not perform not only PDCCH or E-PDCCH transmission for the MTC UE, but also associated PDSCH transmission, and the UE (i.e., MTC UE) may operate in a discontinuous Rx (DRX) mode within the corresponding subframe.

In addition, within the remaining UL subframes other than an uplink (UL) active subframe, the MTC UE may not perform PUSCH and PUCCH transmission, and may operate in a discontinuity TX (DTX) mode in the above remaining UL subframes. However, even in the remaining subframes other than the DL active subframe, the MTC UE receives a Common Reference Signal (CRS) or a Channel State Information—Reference Signal (CSI-RS) and thus performs downlink channel measurement. As a result, a method for allocating the active DL/UL subframes will hereinafter be described in detail.

<DL/UL Active Subframe Allocation for Use in Frame Structure Type 1>

DL/UL Active Subframe Allocation Method 1

In the case of 3GPP LTE type-1 Frame Structure Type 1, a BS may establish a parameter (ActiveSubframeConfigurationFDD) for DL active subframe allocation for a certain MTC UE, and may transmit this parameter to the MTC UE through UE-specific higher layer signaling. The parameter (ActiveSubframeConfigurationFDD) includes a bitmap field composed of a total of N bits, such that a DL active subframe in which a pattern is repeated at intervals of N subframes according to bit configuration corresponding to each bitmap can be allocated.

For example, the size (N) of the bitmap field for DL active subframe allocation may be denoted by 8 bits identical to a HARQ Round Trip Time (RTT) value. In this case, the DL active subframe can be allocated by the following equation 1.

$$[(10 \cdot n_f + \lfloor n_s/2 \rfloor) \bmod 8] \in \Delta_{ASC} \qquad \text{[Equation 1]}$$

In Equation 1, $n_f$ and $n_s$ may denote cell timing values of a donor eNB to which the corresponding MTC UE pertains. In more detail, $n_f$ may denote a system frame number, and $n_s$ may denote a slot number within a radio frame. Accordingly, the processor 155 of the MTC UE can recognize that a set $\Delta_{ASC}$ of DL active subframes is composed of a union of DL subframes corresponding to $n_f$ and $n_s$ decided when an offset value corresponding to each bitmap field configuration defined in Table 4 is applied to Equation 1. The following Table 4 exemplarily shows a DL active subframe for the MTC UE for use in Frame structure Type 1.

TABLE 4

| ActiveSubframeConfigurationFDD | Offset value element of $\Delta_{ASC}$ |
| --- | --- |
| {xxxxxxx1} | 7 |
| {xxxxxx1x} | 6 |
| {xxxxx1xx} | 5 |
| {xxxx1xxx} | 4 |
| {xxx1xxxx} | 3 |
| {xx1xxxxx} | 2 |
| {x1xxxxxx} | 1 |
| {1xxxxxxx} | 0 |

Referring to Table 4, if the parameter (ActiveSubframeConfigurationFDD) is set to {xxxxxxx1}, an offset value element of $\Delta_{ASC}$ is denoted by 7. In this way, if the parameter (ActiveSubframeConfigurationFDD) is respectively set to {xxxxxx1x}, {xxxxx1xx}, {xxxx1xxx}, {xxx1xxxx}, {xx1xxxxx}, {x1xxxxxx}, and {1xxxxxxx}, the offset value element of $\Delta_{ASC}$ is respectively set to 6, 5, 4, 3, 2, 1, and 0. From among 8 DL subframes repeated according to the number of bitmaps (each of which is set to 1) from among the bitmap field composed of 8 bits, a total of 1 to 8 DL active subframes may be configured.

DL/UL Active Subframe Allocation Method 2

In accordance with another embodiment of a DL active subframe pattern that is repeated at intervals of 8 ms corresponding to HARQ RTT, the parameter (ActiveSubframeConfigurationFDD) for the DL active subframe for a certain MTC UE may be composed of 3 bits. In this case, an offset value for configuring the DL active subframe set decided by Equation 1 may be configured as shown in the following Table 5. In this case, from among 8 DL subframes repeated according to the corresponding ActiveSubframeConfigurationFDD configuration, only one DL subframe may be allocated as a downlink active subframe. The following Table 5 shows another example of the DL active subframe for the MTC UE for use in Frame structure Type 1.

TABLE 5

| ActiveSubframeConfigurationFDD | Offset value element of $\Delta_{ASC}$ |
| --- | --- |
| '111' | 7 |
| '110' | 6 |
| '101' | 5 |
| '100' | 4 |
| '011' | 3 |
| '010' | 2 |
| '001' | 1 |
| '000' | 0 |

The processor 155 of the MTC UE may decide an offset value corresponding to the ActiveSubframeConfigurationFDD value on the basis of the parameter (ActiveSubframeConfigurationFDD) value received from the BS, and may recognize a DL active subframe by applying the decided offset value to Equation 1. In this case, one DL subframe from among 8 subframes may be allocated as the DL active subframe.

DL/UL Active Subframe Allocation Method 3

In another embodiment for configuring a DL active subframe for the MTC UE, the DL active subframe may be configured as a C-RNTI function of the MTC UE. For example, it is possible to use a parameter value (ActiveSubframeConfigurationFDD) for indicating that a predetermined number of Least Significant Bits (LSBs) (e.g., LSB 3 bits) or a predetermined number of Most Significant Bits (MSBs) (e.g., MSB 3 bits) of C-RNTI of a certain MTC UE is allocated to the DL active subframe, and the parameter value (ActiveSubframeConfigurationFDD) is applied to Table 5, such that the offset value element of $\Delta_{ASC}$ corresponding to Equation 1 can be decided. In this case, only one subframe can be configured as the DL active subframe at intervals of 8 ms according to C-RNTI of the MTC UE. In another example, the parameter (ActiveSubframeConfigurationFDD) of Table 4 is replaced with some LSBs (e.g., LSB 8 bits) or some MSBs (e.g., MSB 8 bits) of C-RNTI, and the offset value element of $\Delta_{ASC}$ corresponding to Equation 1 is decided on the basis of the resultant parameter. All DL subframes satisfying the above-mentioned offset value element may be allocated to DL active subframes. In this case, 1 to 8 DL active subframes may be allocated to the DL active subframes according to the C-RNTI value of the MTC UE at intervals of 8 ms.

In accordance with a method for allocating the UL active subframe for a certain MTC UE, an uplink located after 4 subframes of all DL active subframes allocated by the above-mentioned DL active subframe allocation method may be implicitly or explicitly allocated as the UL active subframe. That is, if a DL subframe #(n-4) of a certain UL subframe #n is set to the DL active subframe, the corresponding UL subframe #n is implicitly configured as the UL active subframe, and the MTC UE can implicitly recognize the configured UL active subframe.

In contrast, the UL active subframe is allocated according to a parameter value (ActiveSubframeConfigurationFDD) configured by higher layer signaling, the DL active subframe may be implicitly allocated as a DL subframe located 4 subframes before the corresponding UL active subframe, and the MTC UE can implicitly recognize the above-mentioned allocation result. That is, in order to enable the processor 155 of the MTC UE to recognize the UL active subframe allocation pattern according to ActiveSubframeConfigurationFDD, the processor 155 can implicitly recognize that the DL subframe located 4 subframes before the UL active subframe is used as the DL active subframe.

<DL/UL Active Subframe Allocation for Use in Frame Structure Type 2>

On the other hand, in case of Frame Structure Type 2 for use in 3GPP LTE, a BS may UE-specifically configure the ActiveSubframeConfigurationTDD value indicating a parameter for DL/UL active subframe allocation for a certain MTC UE, and may transmit the configured ActiveSubframeConfigurationTDD value to each UE through higher layer signaling.

In this case, a detailed description of the DL/UL active subframe configuration corresponding to the ActiveSubframeConfigurationTDD value is as follows. The DL/UL active subframe configuration corresponding to each ActiveSubframeConfigurationTDD value shown in Table 6 may be achieved through table mapping. However, the following Table 6 shows one example of the DL/UL active subframe of the table mapping scheme, and all the table mapping schemes including Table 6 may be contained in the scope of the present invention.

Table 6 shows exemplary configuration for the DL/UL active subframe for the MTC UE for use in Frame Structure Type 2.

TABLE 6

| ActiveSubframeConfiguration TDD | eNB-RN uplink-downlink configuration | Subframe number n | | | | | | | | | |
|---|---|---|---|---|---|---|---|---|---|---|---|
| | | 0 | 1 | 2 | 3 | 4 | 5 | 6 | 7 | 8 | 9 |
| 0 | 1 | | | | D | | | | U | | |
| 1 | | | | U | | | | | | | D |
| 2 | | | | | D | | | | U | | D |
| 3 | | | | U | D | | | | | | D |
| 4 | | | | U | D | | | | U | | D |
| 5 | 2 | | U | | | | | | | D | |
| 6 | | | | | D | | | U | | | |
| 7 | | | | U | | D | | | | D | |
| 8 | | | | | D | | | | U | | D |
| 9 | | | | U | D | D | | | | D | |
| 10 | | | | | D | | | | U | D | D |
| 11 | 3 | | | U | | | | | D | | D |
| 12 | | | | U | | | | | D | D | D |
| 13 | 4 | | | U | | | | | | | D |
| 14 | | | | U | | | | | D | | D |
| 15 | | | | U | | | | | | D | D |
| 16 | | | | U | | | | | D | D | D |
| 17 | | | | U | D | | | | D | D | D |
| 18 | 6 | | | | | U | | | | | D |

Referring to Table 6, if the BS transmits the ActiveSubframeConfigurationTDD value to the MTC UE through higher layer signaling, the processor 155 of the MTC UE may recognize DL/UL active subframe configuration information corresponding to the ActiveSubframeConfigurationTDD value, and may be controlled to receive/transmit signals in this DL/UL active subframe. In Table 6, D denotes a DL subframe, and U denotes a UL subframe.

As is apparent from the above description, the MTC UE (or MTC terminal) according to the embodiments transmits/receives signals through the DL/UL active subframes allocated in various ways, resulting in implementation of efficient communication.

Exemplary embodiments described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. Also, it will be obvious to those skilled in the art that claims that are not explicitly cited in the appended claims may be presented in combination as an exemplary embodiment of the present invention or included as a new claim by subsequent amendment after the application is filed.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation f the appended claims and all changes within the equivalent scope of the invention are within the scope of the invention.

INDUSTRIAL APPLICABILITY

The method and apparatus for transmitting and receiving signals by a Machine Type Communication (MTC) terminal in a wireless communication system according to the embodiments can be applied to various mobile communication systems, for example, 3GPP LTE, LTE-A, IEEE 802, etc. for industrial purposes.

The invention claimed is:

1. A method for transceiving a signal by a Machine Type Communication (MTC) user equipment (UE) in a wireless communication system, the method comprising:
   receiving a parameter associated with active subframe information for the MTC UE from a base station (BS);
   acquiring information regarding the active subframe allocated to the MTC UE using the received parameter; and
   transmitting/receiving a signal to/from the BS through at least one active subframe based upon the acquired information regarding the active subframe,
   wherein the acquired information regarding the active subframe is composed of $n_f$ which denotes a system frame number, and $n_s$ which denotes a slot number within a radio frame,
   wherein the $n_f$ and the $n_s$ are decided from [Equation 1],
   wherein the [Equation 1] is $[(10 \cdot n_f + \lfloor n_s/2 \rfloor) \bmod 8] = \text{first offset value}$, wherein the first offset value is a chosen integer among 0 to 7 based on the received parameter, and
   wherein the $\lfloor \ \rfloor$ is a flooring function, and the mod is a modular arithmetic.

2. The method according to claim 1, wherein the active subframe is specifically configured per MTC UE, and the parameter is received through a higher layer signaling.

3. The method according to claim 1, wherein:
   the parameter is received as a bitmap field having a size of predetermined bits or as a type of bit value having a predetermined size, and
   a set of the active subframe is acquired based upon the parameter, and the at least one active subframe is a subframe contained in the acquired active subframe set.

4. The method according to claim 3, wherein the parameter is a bitmap field having a size of 8 bits, and the active subframe set includes any one of 1 to 8 active subframes.

5. The method according to claim 3, wherein:
if the parameter is represented by the bit value of the predetermined size, the parameter is represented by a function of a cell—radio network temporary identifier (C-RNTI) of the MTC UE.

6. The method according to claim 5, wherein:
the C-RNTI function of the MTC UE is set to Least Significant Bits (LSBs) having a size of predetermined bits of the C-RNTI, or is set to Most Significant Bits (MSBs) having a size of predetermined bits of the C-RNTI.

7. The method according to claim 6, wherein the size of predetermined bits is 3 bits or 8 bits.

8. The method according to claim 3, wherein the size of predetermined bits is 3 bits, and the active subframe set acquired on the basis of the parameter of 3 bits includes a single active subframe.

9. The method according to claim 1, wherein the parameter is used in a Frequency Division Duplex (FDD) frame structure.

10. The method according to claim 1, further comprising:
if the active subframe is a downlink active subframe,
acquiring information regarding the downlink active subframe based upon a parameter associated with the downlink active subframe; and
recognizing an uplink subframe located after 4 subframes from the downlink active subframe as an uplink active subframe.

11. The method according to claim 1, further comprising:
if the active subframe is an uplink active subframe,
acquiring information regarding the uplink active subframe on the basis of a parameter associated with the uplink active subframe; and
recognizing a downlink subframe located 4 subframes before the uplink active subframe as a downlink active subframe.

12. A Machine Type Communication (MTC) user equipment (UE) for transmitting/receiving a signal to/from a base station (BS) in a wireless communication system, comprising:
a radio frequency (RF) module configured to receive a parameter associated with active subframe information for the MTC UE from the base station (BS); and
a processor configured to acquire information regarding the active subframe allocated to the MTC UE using the received parameter,
wherein the RF module is configured to transmit/receive a signal to/from the BS through at least one active subframe based upon the acquired information regarding the active subframe,
wherein the acquired information regarding the active subframe is composed of $n_f$ which denotes a system frame number, and $n_s$ which denotes a slot number within a radio frame,
wherein the $n_f$ and the $n_s$ are decided from [Equation 1], wherein the [Equation 1] is $$[(10 \cdot n_f + \lfloor n_s/2 \rfloor) \bmod 8] = \text{first offset value},$$

wherein the first offset value is a chosen integer among 0 to 7 based on the received parameter, and
wherein the $\lfloor \ \rfloor$ is a flooring function.

13. The Machine Type Communication (MTC) user equipment (UE) according to claim 12, wherein:
the parameter is received as a bitmap field having a size of predetermined bits or as a type of bit value having a predetermined size, and
the processor is configured to acquire a set of the active subframe based upon the parameter, wherein he at least one active subframe is a subframe contained in the acquired active subframe set.

14. The Machine Type Communication (MTC) user equipment (UE) according to claim 13, wherein:
if the active subframe is a downlink active subframe,
the processor is configured to acquire information regarding the downlink active subframe based upon a parameter associated with the downlink active subframe, and is configured to recognize an uplink subframe located after 4 subframes from the downlink active subframe as an uplink active subframe.

15. The Machine Type Communication (MTC) user equipment (UE) according to claim 13, wherein:
if the active subframe is an uplink active subframe,
the processor is configured to acquire information regarding the uplink active subframe based upon a parameter associated with the uplink active subframe, and is configured to recognize a downlink subframe located 4 subframes before the uplink active subframe as a downlink active subframe.

* * * * *